(No Model.)

P. FORD.
TEA KETTLE.

No. 342,293. Patented May 18, 1886.

WITNESSES:
Geo V Berger
C. Sedgwick

INVENTOR:
P. Ford
BY Munn & Co
ATTORNEYS.

UNITED STATES PATENT OFFICE.

PIERCE FORD, OF TUCSON, ARIZONA TERRITORY.

TEA-KETTLE.

SPECIFICATION forming part of Letters Patent No. 342,293, dated May 18, 1886.

Application filed November 17, 1885. Serial No. 183,095. (No model.)

*To all whom it may concern:*

Be it known that I, PIERCE FORD, of Tucson, in the county of Pima and Territory of Arizona, have invented new and useful Improvements in Tea-Kettles, of which the following is a full, clear, and exact description.

The object of my invention is to provide certain new and useful improvements in tea-kettles, whereby the construction of the kettle is simplified, and the same can be used for warming plates or keeping food warm.

The invention consists in the construction and combination of parts and details, as will be fully described and set forth hereinafter, and then pointed out in the claims.

Reference is to be had to the accompanying drawings, forming a part of this specification, in which similar letters of reference indicate corresponding parts in all the figures.

Figure 1:
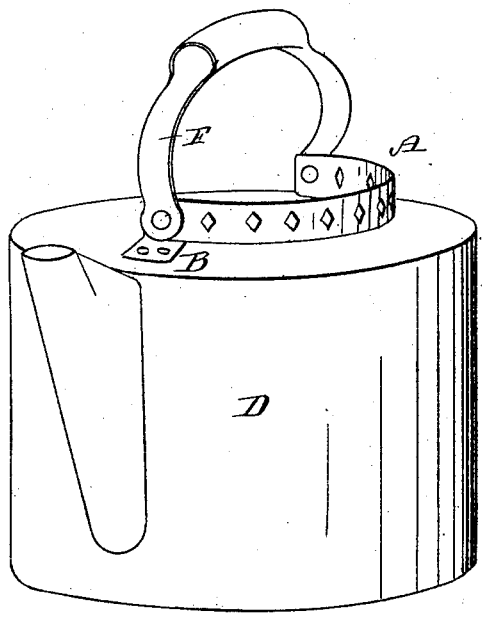
Figure 2:
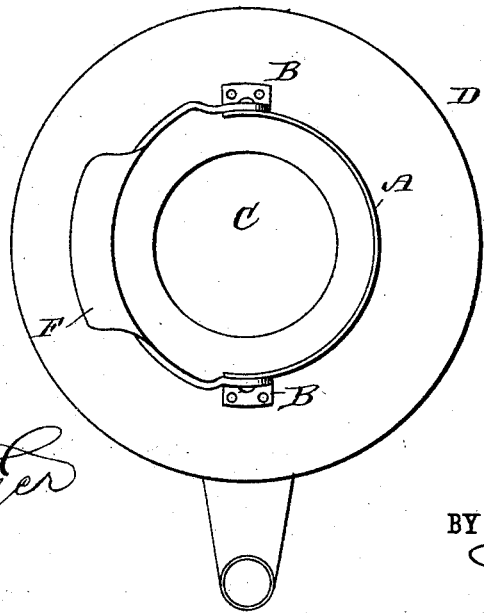

Figure 1 is a perspective view of my improved tea-kettle. Fig. 2 is a plan view of the same.

The sheet-metal strip A is provided at each end with a lug, B, on the bottom edge, which lugs are bent at right angles to the said strip, and the said strip is bent in the shape of a semicircle, and is placed a short distance from or beyond the edge of the opening C of the tea-kettle D in such a manner that it projects from the top of the kettle, and the lugs B are riveted, and the strip A is soldered to the top of the kettle to hold the said strip fixed on the top of the kettle along the edge of the opening and to strengthen the top of the kettle. The ends of the bail F, which may be of any well-known construction, are pivoted to the ends of the semicircular strip, and thus no extra ears or lugs are required for the bail. Plates or dishes that are to be kept warm, or dishes containing food that is to be kept warm, can be placed on the said strip A and the bail F.

The strip may be ornamented by punching out parts, as shown, or in any other suitable manner.

Having thus fully described my invention, I claim as new and desire to secure by Letters Patent—

1. The combination, with a kettle, of a semicircular strip secured edgewise on the top of the same beyond the edge of the opening, and a pivoted bail, substantially as herein shown and described.

2. The combination, with a kettle, of a strip secured edgewise on the top of the kettle beyond the edge of the top opening, and a bail pivoted to the ends of the said strip, the said bail being of approximately the same width as the strip, substantially as herein shown and described.

3. The combination, with a kettle, of a semicircular strip on the top of the same, which strip has end lugs, which are riveted on the top of the kettle, and a pivoted bail, of approximately the same width as the said strip, substantially as herein shown and described.

4. The combination, with a kettle, of a semicircular strip placed on the top of the same and provided on its ends with lugs, which are riveted on the top of the kettle, and of a bail pivoted on the ends of the said strip, the said bail being of approximately the same width as the strip, substantially as herein shown and described.

PIERCE FORD.

Witnesses:
H. F. BURNETT,
RICHARD STARR.